United States Patent
Moon et al.

(10) Patent No.: US 10,628,045 B2
(45) Date of Patent: Apr. 21, 2020

(54) INTERNAL DATA TRANSFER MANAGEMENT IN A HYBRID DATA STORAGE DEVICE

(71) Applicant: Seagate Technology LLC, Cupertino, CA (US)

(72) Inventors: John E. Moon, Superior, CO (US); Stanton M. Keeler, Longmont, CO (US); Leata M. Blankenship, Longmont, CO (US); Greg D. Larrew, Berthoud, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/191,008

(22) Filed: Jun. 23, 2016

(65) Prior Publication Data

US 2017/0371554 A1    Dec. 28, 2017

(51) Int. Cl.
*G06F 3/06* (2006.01)

(52) U.S. Cl.
CPC .............. *G06F 3/061* (2013.01); *G06F 3/068* (2013.01); *G06F 3/0649* (2013.01)

(58) Field of Classification Search
CPC .... G06F 3/0607; G06F 3/0685; G06F 3/0659; G06F 3/0644
See application file for complete search history.

(56) References Cited

U.S. PATENT DOCUMENTS

| | | | |
|---|---|---|---|
| 7,861,038 B2 | 12/2010 | Fontenot et al. | |
| 8,639,872 B1 | 1/2014 | Boyle et al. | |
| 8,661,194 B2 | 2/2014 | Nam | |
| 9,009,393 B1 | 4/2015 | Sutardja | |
| 9,182,927 B2 | 11/2015 | Liu et al. | |
| 9,785,563 B1* | 10/2017 | Ding | G06F 12/0888 |
| 2003/0163777 A1* | 8/2003 | Holt | G06F 11/1004 714/763 |
| 2008/0024899 A1* | 1/2008 | Chu | G06F 3/0614 360/69 |
| 2008/0052456 A1* | 2/2008 | Ash | G06F 12/0804 711/113 |
| 2010/0088459 A1 | 4/2010 | Arya et al. | |
| 2012/0166749 A1* | 6/2012 | Eleftheriou | G06F 3/0616 711/165 |
| 2013/0159626 A1* | 6/2013 | Katz | G06F 3/0608 711/119 |
| 2014/0207996 A1 | 7/2014 | Fisher et al. | |
| 2014/0233132 A1 | 8/2014 | Budiman et al. | |

* cited by examiner

Primary Examiner — Larry T Mackall
(74) Attorney, Agent, or Firm — Hall Estill Attorneys at Law (57) ABSTRACT

Apparatus and method for managing data in a hybrid data storage device. In some embodiments, the hybrid data storage device has a hard disc drive (HDD) controller circuit coupled to non-volatile rotatable storage media and a solid state drive (SSD) controller circuit coupled to non-volatile solid state memory. A local memory stores a map structure which identifies logical addresses of current version data sets stored in the solid state memory. A top level controller circuit operates responsive to the map structure to direct a selected host data transfer access command to the HDD or SSD controller circuit. The map structure may be arranged as a plurality of discrete logical address sequences, where a gap is provided between each adjacent pair of the discrete logical address sequences in the map structure.

20 Claims, 5 Drawing Sheets

FIG. 1

ROTATABLE MEDIA STORAGE SUBSYSTEM

FIG. 2

SOLID STATE (FLASH) MEDIA STORAGE SUBSYSTEM

INTERNAL DATA TRANSFER MANAGEMENT IN A HYBRID DATA STORAGE DEVICE

SUMMARY

Various embodiments of the present disclosure are generally directed to a hybrid data storage device that utilizes internal data transfer techniques to transfer data between different memory storage structures.

In some embodiments, a hybrid data storage device has a hard disc drive (HDD) controller circuit coupled to non-volatile rotatable storage media and a solid state drive (SSD) controller circuit coupled to non-volatile solid state memory. A local memory stores a map structure which identifies logical addresses of current version data sets stored in the solid state memory. A top level controller circuit operates responsive to the map structure to direct a selected host data transfer access command to the HDD or SSD controller circuit. The map structure may be arranged as a plurality of discrete logical address sequences, where a gap is provided between each adjacent pair of the discrete logical address sequences in the map structure.

In other embodiments, a method includes steps of configuring a hybrid data storage device to receive host data transfer access commands from a host device, the hybrid data storage device comprising a hard disc drive (HDD) controller circuit coupled to non-volatile rotatable storage media, a solid state drive (SSD) controller circuit coupled to non-volatile solid state memory, and a top level controller circuit coupled to the respective HDD and SSD controller circuits; generating and storing, in a local memory, a map structure which identifies logical addresses of current version data sets stored in the solid state memory as a plurality of logical address sequences with an intervening gap between each successive pair of the logical address sequences; receiving a selected host data transfer access command from a host device; identifying a selected logical address associated with the received selected host data transfer access command; and directing the received selected host data transfer access command to the SSD controller circuit to effect a data transfer with the solid state memory responsive to the selected logical address falling within a selected one of the plurality of logical address sequences or within a selected one of the intervenging gaps between said successive pairs of the logical address sequences.

These and other features and aspects of various embodiments of the present disclosure can be understood upon a review of the following detailed description in conjunction with the associated drawings.

DETAILED DESCRIPTION

The present disclosure generally relates to data storage systems, and more particularly to the management of internal data transfers in a hybrid data storage device.

Data storage devices operate to store and retrieve computerized user data in a fast and efficient manner. Data storage devices can utilize a variety of different types of storage media, including rotatable recording discs of the type commonly used in hard disc drives (HDDs) and solid state semiconductor memory of the type commonly used in solid state drives (SSDs).

So-called hybrid data storage devices utilize two or more distinct forms of non-volatile storage media to store user data. Some forms of hybrid data storage devices (HDSDs, also sometimes referred to as solid state hybrid drives, or SSHDs) utilize a main memory formed from rotatable magnetic recording media (e.g., magnetic discs) and a smaller auxiliary memory formed from solid state (e.g., flash) memory cells. Both forms of storage media provide a combined non-volatile storage space to store user data transferred to the device from a host.

Hybrid devices are designed to combine the benefits of low cost mass storage afforded by rotatable magnetic recording media with the faster transfer rate performance provided by solid state memory (e.g., flash). It is common to operate a hybrid device in such a way that high priority data tend to be stored in the solid state memory since such memory tends to provide faster data transfer rates as compared to the relatively slower rotatable media. Ideally, hybrid devices should provide faster overall transfer rate performance that conventional HDDs and should be significantly less expensive than SSDs. The ratio of solid state memory to rotatable storage in a hybrid device can vary, but usually the amount of storage capacity provided by the solid state memory is on the order of about 1-2% of the size of the rotatable media. Other relative values and ratios can be used as desired.

While hybrid devices have been found operable in providing enhancements in the overall data transfer capacity of a storage device as compared to an HDD, there are a number of limitations that have been found to be unique to hybrid devices that are not easily resolved. It is well established that current generation SSDs can sustain significant data transfer rates, such as on the order of 400 megabytes (MB, $10^9$ bytes) per second (MB/s) or more. Depending on a number of factors, rotatable disc HDDs can sustain data transfer rates that are perhaps 10-15% of an SSD.

It might be expected that hybrid drives would provide significantly better transfer rate performance than HDDs due to the inclusion of the solid state memory which, if properly managed, should result in significant increases in the overall data rate for the device. After all, the solid state memory in a hybrid device will tend to have native transfer rates consonant with those of SSDs, and the most active data sets will be maintained in the solid state memory of the hybrid device. Conventional wisdom would further suggest that increasing the ratio of the solid state memory in a hybrid device, such as to 20-25% or more of the native disc capacity, would tend to further enhance the overall data transfer rate of the hybrid device. In practice, this has not generally been the case.

One limitation associated with hybrid devices is that, as noted above, the faster solid state memory only constitutes a small proportion of the overall total storage capacity of the device. Thus, unlike an SSD where all data stored by the device will be resident in the solid state memory, only a small portion of the available data will be stored in the solid state memory in a hybrid device, and this data will change over time. There is accordingly a large processing overhead required to identify, track and manage the data stored in the solid state memory. Increasing the size of the solid state memory would increase this overhead processing burden and could potentially result in a slower overall transfer rate.

Another unique property associated with most hybrid devices is that all data sets received by a hybrid device will usually also be stored by the rotatable media. Even if data are initially stored in the flash memory, a backup copy will be written to disc using a process sometimes referred to as data cleaning. In a similar fashion, sometimes data sets initially stored to the disc media will be migrated, or promoted, to the flash (so called "data pinning"). Data cleaning and pinning operations are usually carried out in the background during normal device operation, and can significantly add to the overall command loading of the device.

Accordingly, various embodiments of the present disclosure are generally directed a hybrid data storage device (HDSD or SSHD) with enhanced internal data transfer capabilities that address these and other limitations associated with the existing art.

As explained below, some embodiments provide a hybrid device with a hard disc drive (HDD) controller circuit that is coupled to non-volatile rotatable storage media (such as a magnetic disc). The hybrid device further has a solid state drive (SSD) controller circuit coupled to non-volatile solid state memory (such as flash). A volatile memory (such as DRAM) is respectively coupled to the HDD and SSD controller circuits to cache data during transfers associated with the rotatable storage media and with the solid state memory.

A top level controller circuit is operably coupled to an interface connector of the hybrid device. Generally, the top level controller directs various access commands received from a host to the HDD and SSD controllers; for data to be stored to disc, the top level controller passes the associated access commands to the HDD controller for ordering in an HDD command queue. For data to be stored to flash, the top level controller passes the associated access commands to the SSD controller for ordering in an SSD command queue. The HDD and SSD controllers process the received access commands in the respective queues to transfer the associated data between the DRAM and the disc and flash, respectively. These actions are carried out concurrently and independently along dual parallel data processing paths.

The top level controller monitors the operation of the respective HDD and SSD controllers, and periodically forwards data cleaning commands to the HDD controller to internally transfer data initially stored in the flash memory to the disc memory. Concurrently, the top level controller periodically forwards data pinning commands to the SSD controller to internally transfer data stored in the disc memory to the flash memory.

Internal data transfers are handled using one or more data structures stored in a suitable memory location that respectively indicate the current contents of the respective DRAM (or other local memory), the disc media, and the flash memory. These data structures may include a linked list having forward pointers to enable the top level controller to quickly identify the contents of the flash memory during host access, cleaning and pinning operations.

It is contemplated that, regardless whether a given access command from the host is a read command or a write command, the top level controller will search the data structure (such as the linked list) to assemble a logical sequence that shows which ranges of logical addresses are currently present in the flash in order to help determine where the data should be stored in the case of a write operation or where the data can be retrieved from in the case of a read operation.

For example, a write command that identifies a selected LBA may be directed to the flash if the data structure indicates that the selected LBA, or one having sequential proximity to the selected LBA, is currently stored in the flash memory. This is based on the recognition that, if the selected LBA is in the flash, it is likely high priority data and therefore placing that data in the flash may result in higher effective I/O rates. Similarly, if the command is a read command, and the requested LBA is in the flash, the data can be retrieved much faster from the flash than from the disc.

The data structure is updated continuously as additional data sets are written to the flash. The top level controller may utilize the data structure to make decisions with regard to what data should be placed into the flash. While cleaning transfers from flash to disc are governed by the requirement that all data must ultimately be written to disc to provide archive protection, pinning transfers from disc to flash may be selectively based on heuristics determined by the top level controller, such as through the use of an access command history, etc.

Figure 1:
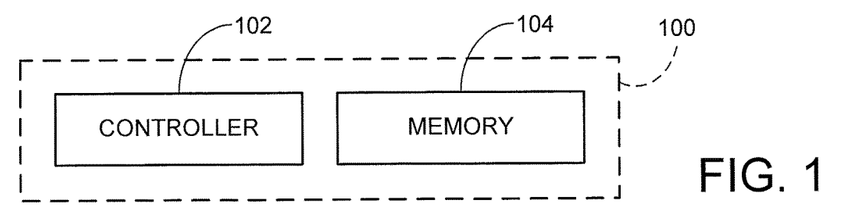
FIG. 1 is a block diagram for a data storage device characterized as a hybrid storage device in accordance with various embodiments.

These and other features and advantages of various embodiments can be understood beginning with a review of FIG. 1 which shows an exemplary data storage device 100. The data storage device 100 includes a controller 102 and a memory 104. The controller 102 is a control circuit that provides top level control functionality for the storage device, and may be realized in hardware, software and/or firmware. The controller circuit may constitute one or more programmable processors having associated programming instructions stored in a memory which, when executed, cause the processor(s) to carry out various control functions as explained herein. Other forms of controller circuit can be utilized, such as hardware circuits, programmable gate arrays, logic networks, application specific integrated circuits (ASICs), system on chip (SOC) devices, etc. As will be recognized, these and other forms of controller circuits may be formed of various logic, storage and switching elements using semiconductor fabrication techniques.

The memory 104 provides non-volatile memory storage for user data transferred to the storage device by a host device. The memory may incorporate a number of different types of non-volatile storage such as solid-state memory (e.g., flash), rotatable storage media, etc. For purposes of the present illustrative example, the device 100 is contemplated as comprising a hybrid data storage device (HDSD or SSHD) so that the memory 104 includes both rotatable storage media and solid state semiconductor memory. While not limiting, the rotatable media are contemplated as magnetic recording media and the solid state memory is contemplated as flash memory. Other arrangements can be used.

Figure 2:
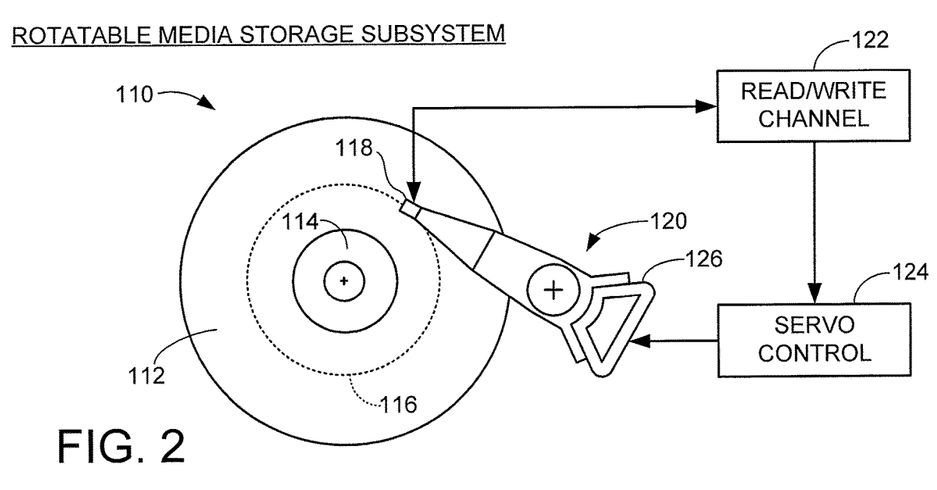
FIG. 2 is an isometric depiction of a rotatable media storage subsystem of the hybrid storage device of FIG. 1 constructed and operated in accordance with some embodiments.

FIG. 2 shows a rotatable media storage subsystem 110 of the memory 104 of FIG. 1 in accordance with some embodiments. The subsystem 110, also sometimes variously referred to as rotatable media or the disc, constitutes aspects of a hard disc drive (HDD) storage system. Various other elements may be incorporated into the subsystem so the diagram is illustrative and not limiting.

One or more rotatable magnetic recording discs 112 are fixed for rotation about a central axis of a spindle motor 114. A number of concentric tracks 116 are arranged on each of the disc surfaces and are accessed by a data read/write transducer (head) 118.

Each head 118 is moved across the surface of the disc using a rotary actuator 120. A read/write (R/W) channel circuit 122 provides write currents to and receives transduced readback signals from each head during respective write and read operations. A servo control circuit 124 provides closed loop positional control of the position of the heads 118 using embedded servo data (not separately shown) from the disc surfaces. The servo circuit 124 applies current to a coil 126 of a voice coil motor (VCM) to adjust the position of a selected head accordingly.

Figure 3:
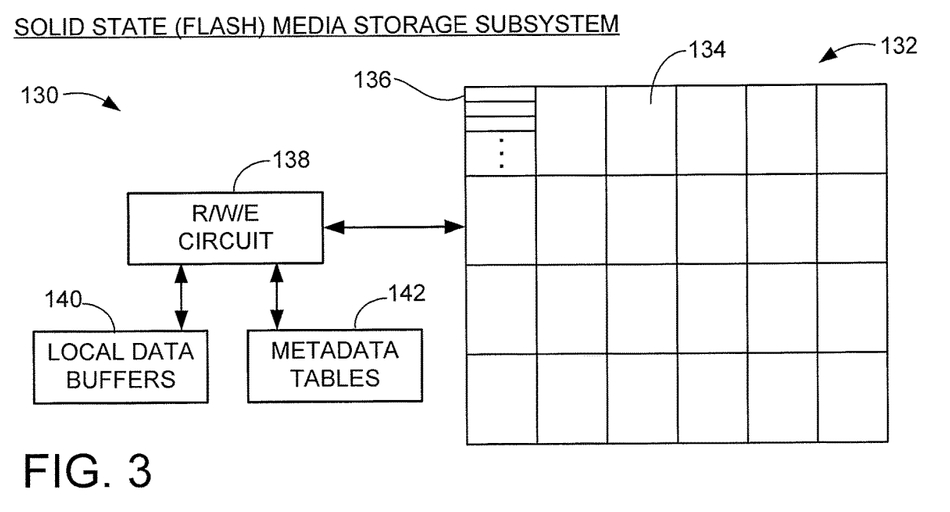
FIG. 3 is an isometric depiction of a solid state (flash) media storage subsystem of the hybrid storage device of FIG. 1 constructed and operated in accordance with some embodiments.

FIG. 3 shows a solid state media storage subsystem 130 of the memory 104 of FIG. 1 in accordance with some embodiments. The subsystem 130 is also sometimes referred to as solid state media or the flash, and is generally arranged as aspects of a solid state drive (SSD) storage system. Various other elements may be incorporated into the subsystem so the diagram is illustrative and not limiting.

The solid state media 130 includes a flash array 132 of flash memory cells arranged into rows and columns. The flash cells are grouped into erasure blocks 134, each constituting a smallest unit of the flash array that can be erased as a unit. Each erasure block 134 is formed from individual pages (row) 136 of memory cells to which fixed sized blocks of data may be written.

A read/write/erase (R/W/E) circuit 138 directs data transfers to and from the respective pages 136, and performs data migrations and erasures during garbage collection operations. A number of local data buffers 140 in the form of volatile memory serve to temporarily buffer data during such activities. Local volatile memory 142 can further be used to load, store and utilize metadata to track the locations and revision levels of various data sets stored in the array 132.

Figure 4:
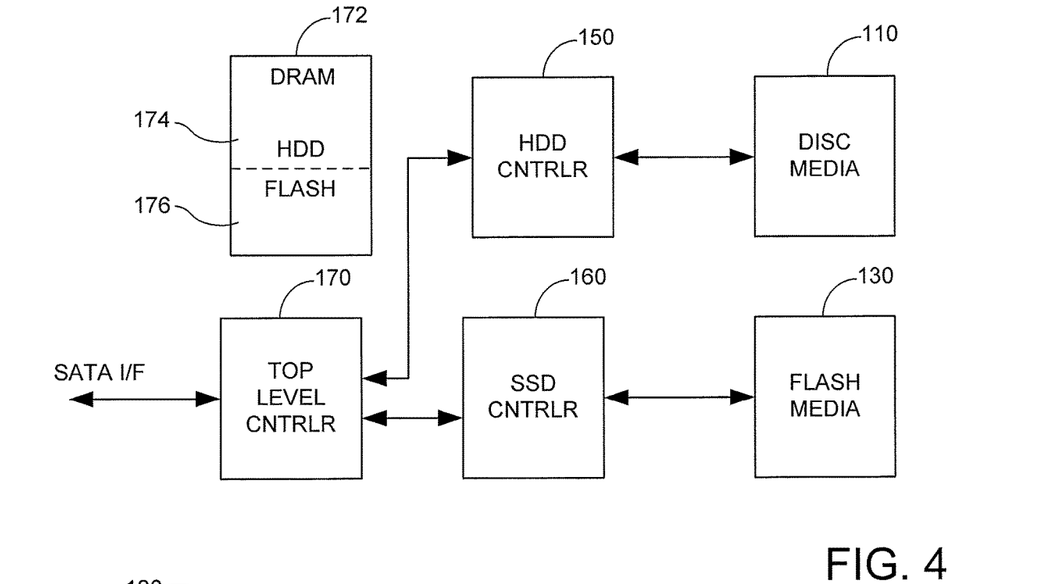
FIG. 4 shows an arrangement of the controller circuitry from FIG. 1 in accordance with some embodiments.

FIG. 4 provides a top level architecture for the device 100 in accordance with some embodiments. The disc media subsystem 110 from FIG. 2 is controlled by an HDD controller circuit 150, and the flash media subsystem 130 from FIG. 3 is controlled by an SSD controller circuit 160. Top level control of these controllers is in turn provided by a top level controller circuit 170. As mentioned above, these respective controller circuits are incorporated into the general controller 102 of FIG. 1 and may be variously realized as discussed above. It is contemplated albeit not necessarily required that these respective control circuits are physically realized as separate programmable processors or hardware processing circuits. The various circuits may be incorporated into a consolidated system on chip (SOC) integrated circuit device.

FIG. 4 further shows a local buffer memory (DRAM) 172. The DRAM is coupled to the respective controllers 150, 160 and 170 and is arranged to store user data during data transfer operations. The DRAM 172 may store other forms of data as well, including programming utilized by the various controllers, control parameters, metadata, state data, etc. The DRAM may be partitioned into separate sections, such as an HDD partition 174 for use by the HDD controller 150 and an SSD partition 176 for use by the SSD controller. Other arrangements can be used.

Without limitation, the architecture as shown in FIG. 4 can be characterized as an SSD with an attached auxiliary HDD subsection. That is, from an architectural standpoint, a primary data path is provided via the top level controller 170, SSD controller 160 and flash media 130. This is true even though the total data storage capacity of the flash media 130 is contemplated as being significantly smaller than the total data storage capacity of the disc media 110. In some embodiments, the flash capacity is less than about 5%, and more in the range of about 1-2%, of the disc capacity. This is not limiting, however, as any respective ratios of solid state memory capacity and rotatable storage data capacity can be accommodated by this embodiment. In some cases, the top level controller 170 may emulate host commands to the HDD controller circuit 150 so that the HDD controller circuit operates as if it is responding directly to the connected host device, but such transfer commands are mediated by the top level controller.

Figure 5:
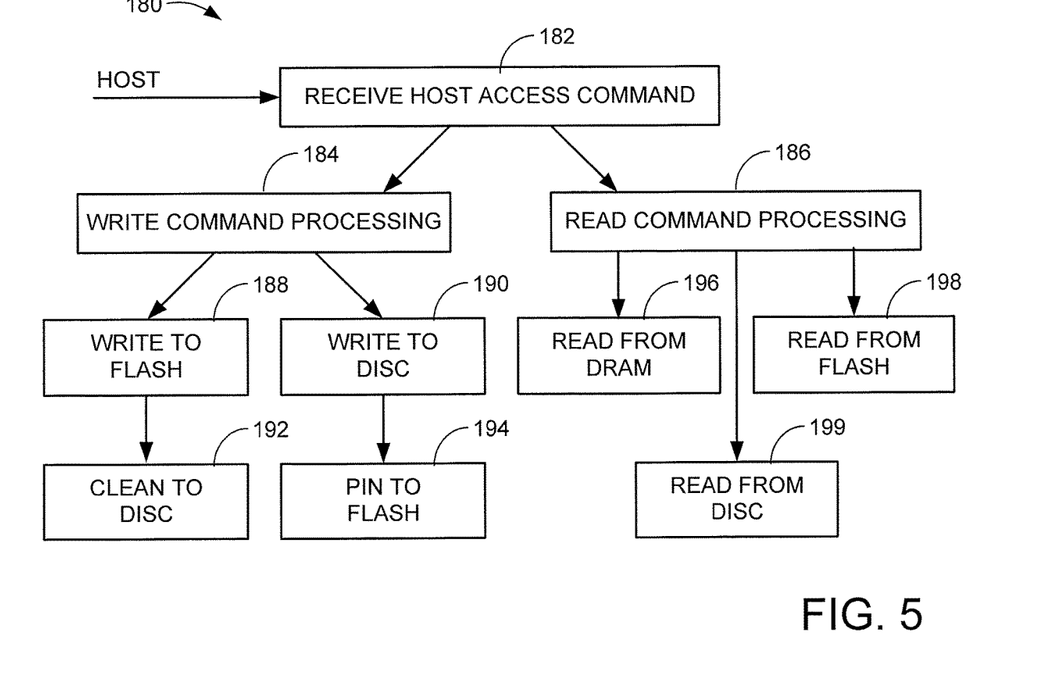
FIG. 5 illustrates a decision tree to provide an overview of various internal data transfers that take place by the storage device under the direction of the top level controller circuit of FIG. 4 in accordance with some embodiments.

FIG. 5 shows a decision tree structure 180 that can be used to illustrate decisions carried out by the top level controller 170 of FIG. 4 in managing various internal data transfers within the hybrid data storage device 100. Details with regard to various decision points within the tree structure will be discussed below.

Initially, host access commands are received from the host device at block 182. Such commands are initially processed by the top level controller circuit 170, including determining whether the command is a write command or a read command. The respective formats of the commands will depend upon a number of factors including the interface protocol employed by the hybrid device (e.g., SAS, SATA, Ethernet, etc.). Regardless, each write command will tend to include some sort of host level logical address that uniquely identifies the data, along with a copy of the write data to be transferred to the hybrid storage device 100. Each read command will tend to include a similar host level logical address indicating the block or blocks of data that are requested to be forwarded to the host device.

At this point it should be noted that some devices employ the use of logical block addresses (LBAs) to uniquely identify sets of data at individually addressable units (e.g., sectors, blocks, etc.). Other logical addressing schemes can be used, such as key value (block) addressing, virtual addressing, etc. A fixed block size may be used for both the disc media 110 and the flash media, or different block sizes may be used. For example, each LBA (or other logical address scheme) may uniquely identify a block (sector) of 512 bytes. Should the flash media storage larger sets of data along each page (see e.g., 136, FIG. 3), multiple LBAs may be arranged to fill out the associated page. For example, if each page in the flash stores 4096 bytes, then each page will be understood as storing up to eight (8) LBAs worth of data (e.g., 512*8=4096).

Block 184 represents write command processing, and block 186 represents read command processing. Each kind of command is processed differently. If the received command is a write command, the decision is made by the top level controller circuit to either write the data to the flash media 130, as shown by block 188, or to write the data to the disc media 110, block 190.

The flash write commands are forwarded to the SSD controller 160 for inclusion in an SSD command queue pending execution by the associated local write circuitry (see FIG. 3). The disc write commands are similarly forwarded to the HDD controller 150 for inclusion in an HDD command queue pending execution by the associated write circuitry (see FIG. 2). Decisions on sending particular data write commands to disc or flash can be based on a number of factors. Generally, higher priority data may be directed to the flash, whereas normal transfers and streaming (e.g., large sequential transfers) may be more suitable for the disc.

Pending such transfers, the input write data are temporarily stored at an appropriate address in the DRAM 172. Writeback processing may be utilized by the device 100 so that the top level controller circuit 170 immediately communicates a command complete status to the requesting host device prior to actual storage of the data in non-volatile memory (flash or disc). This allows the respective HDD and SSD controllers to execute the write command in an optimal order in the near future (such as within a predetermined time interval) without causing delays at the host for further command processing. Should an unexpected power interrupt condition be experienced, the device 100 may be configured to write all of the pending data contents in the DRAM to the flash or a media cache portion of the discs prior to complete loss of power, as is known in the art.

Once data are written to the flash, a cleaning operation is subsequently scheduled, as indicated at block 192. As noted above, all data initially written to flash will be copied to disc to provide an archived backup of the data. This is true even if the data are maintained in the flash. Selected data sets initially written to the discs will be periodically promoted to the flash using a pinning operation, as indicated at step 194. Data structures utilized by the top level controller circuit 170 during each of these respective operations (blocks 188, 190, 192 and 194) will be discussed below.

For the read command processing of block 186, the top level controller circuit uses the same or similar data structures to locate the requested data and return the same to the requesting host. The data may be read from the DRAM, block 196, the flash, block 198, or the disc 199. It is contemplated albeit not necessarily required that the searching carried out by the top level controller circuit 170 will take place in the foregoing order. In some cases, however, the system may elect to instead search the flash first, on the basis that it can be more efficient to satisfy read requests directly from the flash rather than performing the additional searching for the requested data in the DRAM 172.

As will be appreciated, depending on the arrangement of the interface protocol, should the data be resident in the DRAM (a cache hit), a notification is forwarded to the requesting host that the data are available and the data are transferred across the interface from the DRAM. Read accesses from the flash media 130 include forwarding the read command to the SSD controller circuit 160 for inclusion in the SSD command queue for scheduling and the transfer of the requested data from the flash memory to the DRAM 172. Read accesses from the disc media 110 are similarly carried out by forwarding the read command to the HDD controller circuit 150 for inclusion in the HDD command queue for scheduled execution and forwarding of the data to the DRAM. It is contemplated that both the HDD and SSD command queues list both write and read commands which are carried out in an optimal order to enhance data I/O rates.

Figure 6:
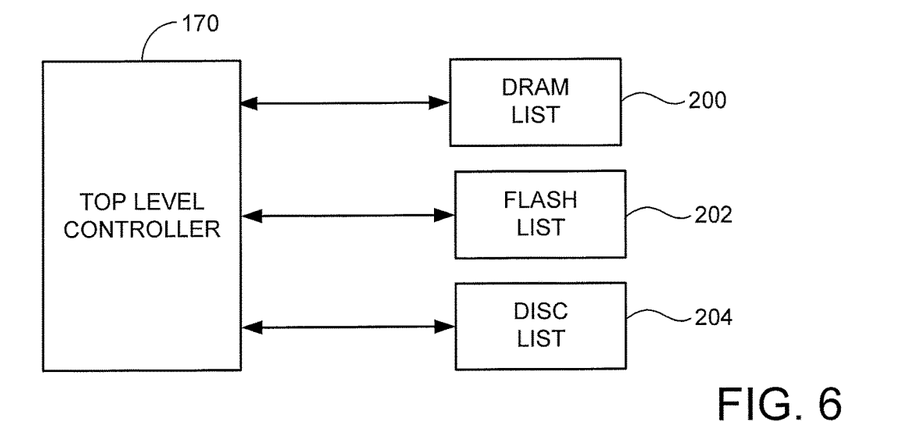
FIG. 6 illustrates various data structures maintained and used by the top level controller circuit.

FIG. 6 is a schematic illustration to denote the various data structures that may be utilized by the top level controller 170 of FIG. 4 in some embodiments. Three such data structures are shown; a DRAM list 200, a flash list 202 and a disc list 204. Other data structures may be used either in addition to or in lieu of these structures. The data structures may take the form of a look up table, a linked list or other suitable data structure to reflect the respective data sets stored in each of the respective memories (DRAM 172, flash media 130 and disc media 110, respectively).

The data structures 200, 202, 204 may be stored in local memory, such as the DRAM 172 or other memory accessible by the top level controller 170. The data structures may include logical or virtual addressing information, such as logical block addresses (LBAs), virtual block addresses (VBAs), etc. associated with the data. The data structures may also include other elements such as physical addresses within the associated media at which the various data sets are stored, status information indicating the status of the data, etc. For example, the DRAM list may list available memory addresses in the DRAM along with a listing of the logical addresses (e.g., LBAs) stored at those locations. The disc list may include other information as well, such as an LBA to PBA (physical block address) conversion table identifying the location of the data by head/media combination, cylinder, track, offset, etc. Regardless of form, the data structures allow the top level controller 170 to quickly and efficiently locate existing data sets and make determinations on where certain data are located to satisfy a read request, and to determine a suitable target location for the storage of input write data during a write request.

Figure 7:
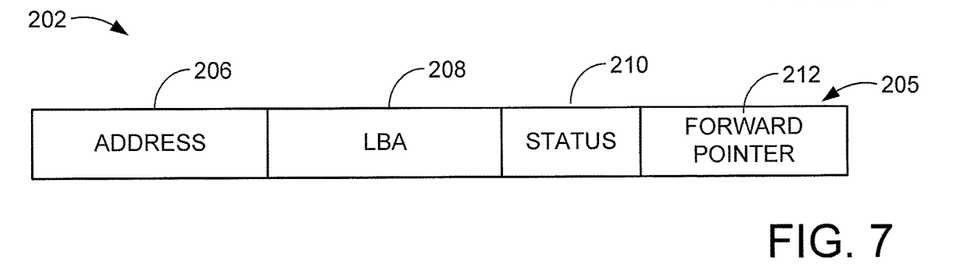
FIG. 7 is an exemplary format for at least some of the data structures of FIG. 6.

Of particular interest is the flash list 202, an example format for which is shown in greater detail in FIG. 7. The flash list 202 enables the system to construct a map to enable the system to quickly identify the location of each data set stored to the flash. As will be recognized, flash memory is erasable in that, generally, each time a new version of a given block of data (e.g., an LBA, etc.) is written to the memory, the new version of the data is written to a new location, and the prior version is marked as stale. This is because generally, once written, flash memory cells require an erasure operation to reset the memory cells to an initial, unerased state before a new set of data may be written to that location.

The exemplary format for the flash list 202 includes a number of entries 205, with each entry having the various data field values shown to track the data in the flash. Other arrangements can be used. The values in each entry 205 may include one or more address values 206, an LBA (or other logical addressing) value 208, a status value 210 and a forward pointer 212. The address values indicate the location within the flash (e.g., array, die, GCU, block, page, offset, etc.) where the associated data identified by the LBA (or other logical address) are stored. The status values provide an indication to the system of the status of the data, such as whether the data are most current data, stale data, etc. Incrementing revision numbers can be utilized, as well as time/date stamp data, etc.

Figure 8:
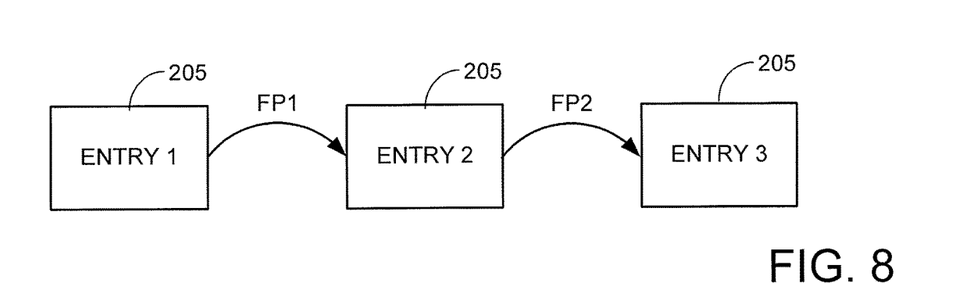
FIG. 8 illustrates the use of forward pointers to locate a most current version of a given data structure in the device.

The forward pointer values 212 operate to enable the system to skip forward to the next entry for a given LBA using a linked list structure, as generally depicted in FIG. 8 In this way, a search is made through the system, jumping forward to the next entry until the last (most current) entry for a given LBA is located.

Figure 9:
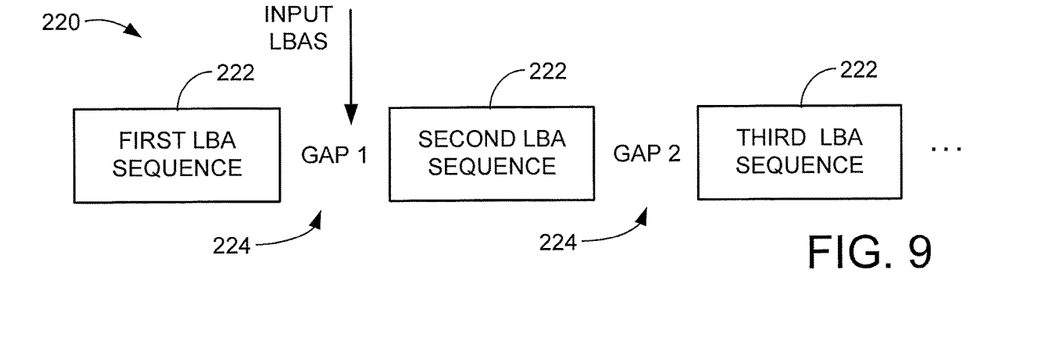
FIG. 9 shows logical sequences of memory contents formulated by the top level controller circuit based on the data structures of FIGS. 6-8.

From this, the top level controller circuit 170 can generate a sequence map 220, as generally depicted in FIG. 9. While the flash may store data sets at various granularities, including individual LBAs, in practice data sets utilized by the host and stored by the device 100 may comprise sets of sequential LBAs. For example, a data set (e.g., a file) may be arranged as 1000 LBAs sequentially extending from LBA X to LBA X+999, and so on.

Accordingly, the map structure may signify various groups of LBA sequences 222, such as sequences 1-3 in FIG. 9, that are stored by the flash memory 130. The first LBA sequence may be, for example, LBAs 0 through A, the second LBA sequence may be LBA B to LBA C, and the third sequence may be LBA D to LBA E. Each sequence may be of different length, and small omissions may exist within each sequence (e.g., a few LBAs that are not accounted for but do not represent an available location for use by the system in storing a new data set).

Gaps 224 are shown in between the respective LBA sequences 222. These represent available locations, from a logical standpoint, where new received data may be written. The map structure 220 can be generated during initialization or at other suitable times and updated as required during device operation to provide an updated listing of the contents of the flash. It will be appreciated at this point that the sequence map 220 is organized at a logical level; additional map structures (not shown) may be provided to identify available physical block locations (e.g., currently allocated GCUs, etc.) to which new data may be written. Separate logical to physical conversion tables (e.g., LBA-to-PBA conversion tables) will be maintained, using the forward linked list of FIGS. 7-8, to provide the metadata necessary to locate the data within the flash.

It follows that, as part of the decision tree of FIG. 5, an incoming write operation may be selected to be provided to the flash based on the logical proximity of the input data to the existing data in the flash. As noted above, if a given LBA associated with an input write command is found to be already stored in the flash memory (such as, for example, between LBA 0 and LBA A in the first LBA sequence 222), the decision may be made to proceed with storing the new version of the given LBA to the flash as well since a prior determination was made to store and maintain the previous version in the flash. Similarly, should the LBA have sufficient logical proximity to an existing LBA that is stored in the flash, such as a given LBA that is close to LBA A (e.g., in the first gap 224 in FIG. 9), the decision may also be made to store the data set in the flash due to the proximity to existing LBAs in the flash.

Another advantage to using a map structure such as in FIG. 9 to decide to place incoming LBAs into the flash is that, should the prior version of the LBA be on a cleaning list of LBAs that need to be cleaned to disc (see block 188, FIG. 5), the cleaning list can be updated with the latest LBA, thereby saving a cleaning step. Thus, providing a short delay before initiating cleaning can reduce internal transfer workloads since the system can wait for the most recent version of the LBA to be provided before performing the cleaning operation.

Figure 10:
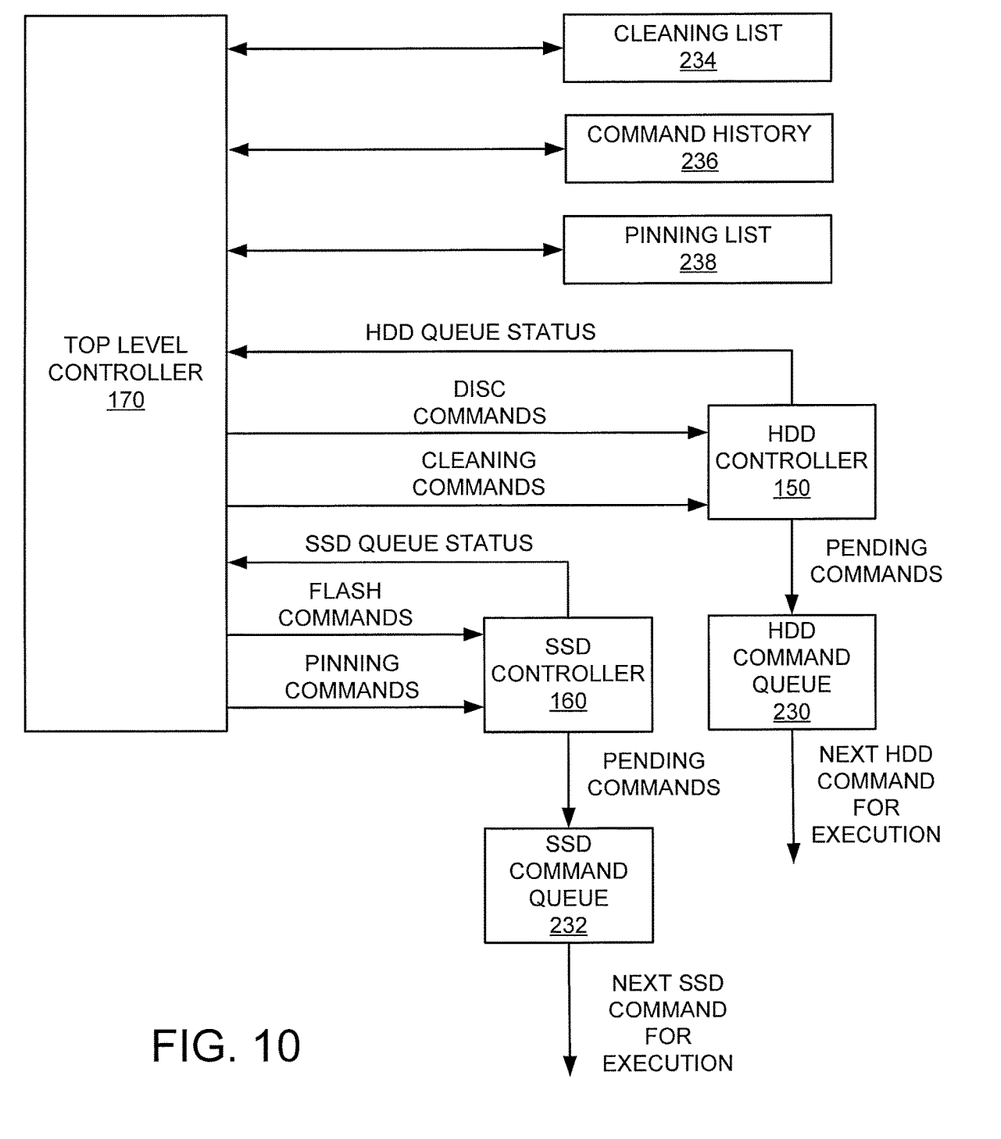
FIG. 10 is a functional block representation of the various controller circuits of FIG. 4 in greater detail.

FIG. 10 provides a functional block representation of a process flow for internal transfers carried out by the device in accordance with the foregoing discussion. The top level controller 170 operates as described above to forward disc commands (whether read commands or write commands) to the HDD controller 150 for inclusion into the HDD command queue, which is denoted at 230, and to forward flash commands to the SSD controller 160 for inclusion into the SSD command queue, denoted at 232.

The HDD command queue 230 is a sorted list of commands for execution involving the rotatable media 112. This sorted list takes into account the rotational angular position of the media, as well as the radial position of the heads 118, to select an optimal order of execution of the pending commands to minimize overall host I/O access rates. In similar fashion, the SSD command queue 232 is a list of pending operations involving data transfers with the flash memory 130.

It will be appreciated that, as known in the art, the sorting of commands in the HDD command queue 230 can employ a complex algorithm that takes into account settling time estimates and rotational latencies to solve for the best ordering of the execution of the pending commands. Generally, the more available commands in the queue, the more efficient the execution of the pending HDD commands. The SSD command queue 232 may take a simpler approach, such as a first in first out (FIFO) arrangement, although there may be efficiencies available through executing commands in parallel to different dies, arrays, etc. within the flash memory.

A flash cleaning list is indicated at 234, and represents a list of data sets that have been stored to the flash memory 130, but corresponding copies of the data sets have not yet been cleaned to the disc memory 110. The flash cleaning list can be generated and maintained in relation to differences between the data stored in the flash (e.g., map structure 220, FIG. 9) and the data stored in the disc (e.g., disc list 204, FIG. 6). Generally, if an LBA is flagged as having a most current version of the block in the flash, and a corresponding copy of this most current version is not present in the disc, it should be added to the cleaning list.

The flash cleaning list can be populated during device initialization and thereafter maintained and updated during device operation. Entries in the cleaning list can be added as new data sets from the host are written to the flash, and entries can be removed as cleaning operations are completed. Timestamp or other aging information can be maintained by the cleaning list to signal pendency of the respective data sets.

The top level controller uses the cleaning list 234 to forward additional cleaning commands to the HDD controller 150 for inclusion in the HDD command queue 230. In some embodiments, an embedded queuing approach is employed such that a few cleaning commands are metered at a time to the HDD command queue during ongoing servicing of the disc commands. The pending number of additional cleaning commands can vary over time to maintain the total number of pending commands in the queue equal to or less than a selected threshold. In this way, data can be continuously cleaned from flash to disc rather than waiting for periods of inactivity on the part of the disc subsystem before initiating the cleaning operation.

A command history table is denoted at 236. This represents another data structure that may be maintained by the top level controller 170 during operation, and represents recent data transfers involving the disc media 110. This structure can take a variety of forms, such as a listing of the most recent X disc commands that have been serviced by the device 100. Separate read and write command lists may be maintained as well, along with other information such as elapsed time, frequency of commands, etc.

The command history information can be used by the top level controller to generate a pinning list 238, representing selected data sets that have been identified for promotion to the flash memory 130. The main copy will continue to be stored by the disc, but a copy will be migrated to flash for faster access in view of read operations. In some cases, host level direction to store data as high priority data may result in the pinning of the data sets in the flash. Certain types of data sets, such as highly requested and/or written files, operating system files, etc., may be selected for pinning to the flash.

Pinning operations are carried out similarly to the cleaning operations, in that the top level controller 170 periodically adds one or more pinning commands to the SSD command queue 232 by forwarding the commands to the SSD controller 160. Both cleaning and pinning may be carried out concurrently.

Each cleaning command forwarded to the HDD controller 150 requires a read operation to be executed by the flash memory 130 to place the readback data into the DRAM 172 (see FIG. 4) so the data are ready to be processed and transferred to the disc media 110. Similarly, each pinning command forwarded to the SSD controller 160 requires a read operation to be executed by the disc media 110 to place the readback data into the DRAM 172 so the data are ready to be processed and transferred to the flash memory 130.

Figure 11:
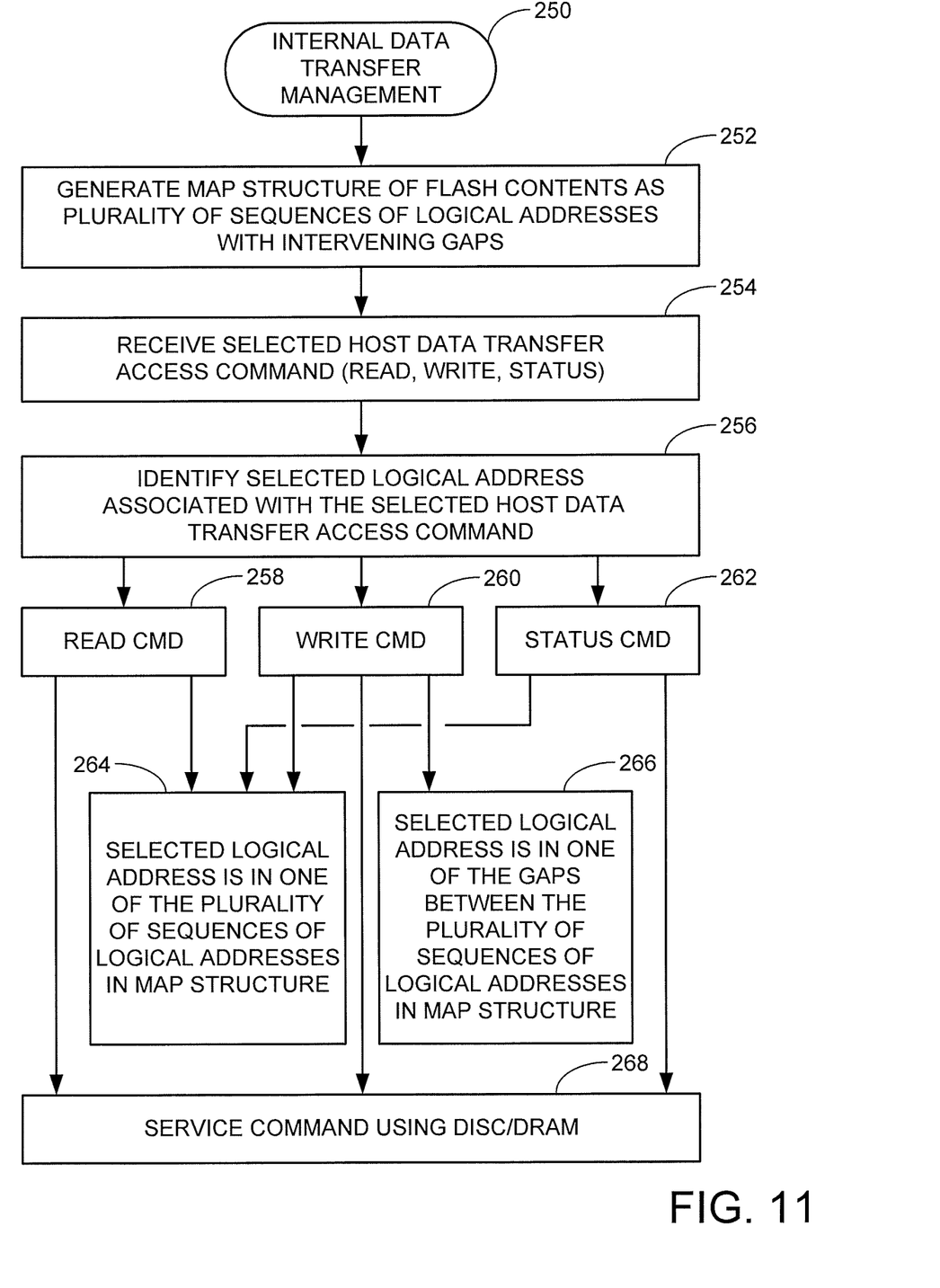
FIG. 11 is a flow chart for an internal data transfer management routine illustrative of steps that may be carried out in accordance with some embodiments by the device of FIG. 1.

FIG. 11 provides a flow chart for an internal data transfer management routine 250 to summarize various aspects of the foregoing discussion. It is contemplated that the routine is performed by the exemplary hybrid data storage device 100 and the various steps are generally representative of programming steps executed by the top level controller circuit 170.

As discussed above in FIG. 9, the process commences at step 252. A map structure of flash contents (e.g., 220) is initially generated as a plurality of sequences of logical addresses 222 with intervening gaps 224 between adjacent pairs of the sequences. Each logical sequence may be expressed as a group of LBAs for which current version data are stored in the flash over an entire range of available LBAs (or other logical addresses) that may be used by the host device to identify individual blocks (e.g., sectors) of user data. Thus, a first sequence might be, for example, LBAs 0-1000; a second sequence may be LBAs 3501-6000 (with a first intervening gap of approximately 2500 LBAs); a third sequence may be LBAs 9,001-15,000 (with a second intervening gap of approximately 3000 LBAs), and so on up to the maximum number of available LBAs in the logical space.

A selected host data transfer access command is next received by the device at step 254. The form of the access command may vary depending on the interface protocol employed. Example forms of access commands may include a read command to retrieve the most current version of user data previously stored by the device, a write command to write a most current version of write data to the device, or a status command associated with a previously executed command or some other factor in which control data may be returned to the host.

A selected logical address associated with the input access command is next identified at step 256. In some cases, multiple logical addresses (such as a range of LBAs) may be associated with the access command. At least one of these LBAs (or other logical addresses) is identified, such as the first LBA in the command.

Different forms of the access commands are thereafter handled differently. Read, write and status commands are separately denoted at blocks 258, 260 and 262. For all three forms of commands (e.g., read, write and status), a check is made to determine whether the selected LBA (or other logical address) from step 256 is located within one of the plurality of sequences in the logical map structure.

Using the example set forth above, if the selected LBA is LBA 500, this would be determined to be in the first sequence of logical addresses since the first sequence ranges from LBA 0 to LBA 1000. This is confirmed at block 264, in which case the associated command is serviced from the flash media 130; that is, the access command is forwarded to the SSD controller circuit 160 for processing.

A special situation arises if the access command is a write command. In this case, the top level controller circuit 170 further determines whether the selected LBA is in one of the gaps in the sequence between adjacent sequences. Using the example set forth above, the first gap comprises the range of LBAs 1001 to 2500. If the selected LBA is within this gap, say LBA 1400, then the data may be written to the flash on the basis that the selected LBA is proximate the existing data in the flash and therefore may be more efficiently handled in the flash due to the apparent high priority of adjacent LBAs. Accordingly, as before the access command is forwarded to the SSD controller circuit 160 for processing.

Finally, if neither of the conditions of steps 264 or 266 are met, the respective access command, whether a read, write or status command, is serviced as otherwise described above, such as via a DRAM cache hit or servicing by the HDD controller circuit 150.

There may be some limits to the logical proximity of LBAs. For example, a relatively large gap, such as a gap that is an order of magnitude or higher than the sizes of the adjacent sequences, may be such that logical proximity is not sufficient to cause the system to store the data in the flash. An excessively large gap of, for example, several tens or hundreds of thousands of LBAs or more between different sequences of LBAs may be adjudged as too large to warrant writing the data to flash. In some cases, some maximum distance in the logical space may be enacted to determine logical proximity. For example, if a given LBA is within some value X of an existing LBA, then the data may be written to flash, otherwise it won't be. X can be any suitable value and can be adaptively adjusted over time. One exemplary value that may be used for X might be X=1000, etc.

It will now be appreciated that the various embodiments presented herein can provide a number of benefits. Using a flash map structure to identify, on a logical address basis, the data currently stored in the flash memory can enable the top level controller to quickly determine a target location for the servicing of input host commands. For write commands, LBAs that are the same or have logical proximity to data currently stored in the flash may be selected for storage in the flash as well. For read commands, LBAs that are currently present in the flash can be serviced quickly, avoiding the need to perform a separate search of the SSD partition of the DRAM for the requested data.

Moreover, by selectively metering the cleaning commands to effect the transfer of data from flash to disc, an orderly internal transfer can be carried out in such a way as to have substantially little or no effect on the host I/O transfer rate. Instead of waiting for periods of idle time (such as, for example, 25 milliseconds of no commands in the HDD command queue) before initiating cleaning operations, ongoing cleaning operations can be carried out continuously. Existing workloads can be taken into account. In some cases, by carefully selecting the cleaning commands, little or no additional processing overhead can be experienced by the HDD controller since such commands can be carried out based on existing system latencies; for example, data writes to existing tracks or bands already subjected to servicing of host commands may be carried out with little or no additional latency time. Pinning commands to transfer data from the disc to the flash can also be handled in like manner concurrently with the cleaning operations discussed above.

The various embodiments presented herein have contemplated a hybrid storage device in which the main, slower memory is a rotatable media memory (e.g., rotatable magnetic recording discs) and the auxiliary, faster memory is a solid state memory (e.g., flash memory). In such case, the cleaning operation serves to transfer data from the relatively faster memory to the relatively slower memory. This is merely exemplary and is not necessarily limiting.

Other embodiments can use any suitable combination of respective memories, including but not limited to applications where the slower main memory is a first form of solid state memory (e.g., erasable flash memory, etc.) and the faster auxiliary memory is a different, second form of solid state memory (e.g., rewritable STRAM, RRAM, PCRAM, PLCs, etc.). In such case, there may be a benefit to use the top level controller circuit to use embedded queuing to schedule the transfers of data from the faster to the slower memory.

This would provide benefits consonant with those discussed above. It is noted, for example, that erasable memories such as flash memory are subjected to periodic garbage collection operations since each subsequent version of a set of data generally needs to be written to a new location, and metadata structures are usually employed to direct the system, such as via forward pointers, to the location of the latest version. Rewritable memories, on the other hand, can be overwritten with existing data and therefore may provide more efficient access, retrieval and management systems.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A hybrid data storage device comprising:
   a hard disc drive (HDD) controller circuit coupled to non-volatile rotatable storage media;
   a solid state drive (SSD) controller circuit coupled to non-volatile solid state memory;
   a local memory which stores a map structure configured to identify logical addresses of current version data sets that are currently stored in the solid state memory, the map structure arranged as a plurality of discrete logical address sequences with a gap, from a logical standpoint, of available logical locations in the map structure provided between each adjacent pair of the discrete logical address sequences in the map structure, each gap identifying a range of logical addresses of data sets that are not currently stored in the solid state memory; and
   a top level controller circuit configured to, responsive to the map structure:
      determine if a logical address of a data block associated with a selected host write command has a logical proximity to another logical address in one of the discrete logical address sequences of the map structure, the logical proximity comprising the logical address of the data block matching the logical address in a first discrete logical address sequence or in an associated gap between the first discrete logical address sequence and an adjacent second discrete logical address sequence of a selected adjacent pair of the discrete logical address sequences;
      if logical proximity is not determined to exist, then direct the selected host write command from the host device to the HDD controller circuit for inclusion in an HDD command queue pending subsequent execution to write the data block to the rotatable storage media; and
      if logical proximity is determined to exist, then to direct the selected host write command to the SSD controller circuit for inclusion in an SSD command queue pending subsequent execution to write the data block to the non-volatile solid state memory.

2. The hybrid data storage device of claim 1, wherein the top level controller circuit directs the SSD controller circuit to transfer the data block to the solid state memory responsive to the logical address of the data block matching the logical address in a first discrete logical address sequence.

3. The hybrid data storage device of claim 1, wherein the top level controller circuit directs the SSD controller circuit to transfer the data block to the solid state memory responsive to the logical address of the data block falling within an intermediate portion of the gap between the first and second discrete logical address sequences in the map structure.

4. The hybrid data storage device of claim 1, wherein at least one logical address falls between the last logical address of the first discrete logical address sequence and the logical address of the data block of the write command.

5. The hybrid data storage device of claim 1, wherein the plurality of discrete logical address sequences of logical addresses in the map structure extend within an available range of logical addresses from a minimum logical address to a maximum logical address that can be assigned by the host to individual data blocks.

6. The hybrid data storage device of claim 1, wherein the rotatable media comprises a magnetic recording disc.

7. The hybrid data storage device of claim 1, wherein the solid state memory comprises a flash memory array.

8. The hybrid data storage device of claim 1, wherein the top level controller circuit emulates communications between the host device and the HDD controller circuit.

9. The hybrid data storage device of claim 1, wherein the local memory comprises a dynamic random access memory (DRAM) partitioned into a first portion used to temporarily store data transferred between the non-volatile rotatable storage media and the host, and a second portion used to temporarily store data transferred between the non-volatile solid state memory and the host.

10. The hybrid data storage device of claim 1, wherein each of the top level controller circuit, the HDD controller circuit and the SSD controller circuit is characterized as a programmable processor that executes associated programming steps stored in a memory.

11. A computer implemented method comprising:
   configuring a hybrid data storage device to receive host data transfer access commands from a host device, the hybrid data storage device comprising a hard disc drive (HDD) controller circuit coupled to non-volatile rotatable storage media, a solid state drive (SSD) controller circuit coupled to non-volatile solid state memory, and a top level controller circuit coupled to the respective HDD and SSD controller circuits;
   generating and storing, in a local memory, a map structure which identifies logical addresses of current version data sets that are stored in the solid state memory as a plurality of logical address sequences with an intervening gap, from a logical standpoint, of available logical locations in the map structure between each successive pair of the logical address sequences in the map structure, each gap identifying a corresponding range of logical addresses of data sets that are not currently stored in the solid state memory;

receiving a selected host data transfer access command from a host device;

identifying a selected logical address associated with a data block identified by the received selected host data transfer access command;

determining, responsive to the map structure, if the selected logical address has a logical proximity to another logical address in one of the discrete logical address sequences by being included in a first selected discrete logical address sequence or falling in the associated gap between the first selected discrete logical address sequence and a successive, second selected discrete logical address sequence;

if logical proximity is not determined to exist, then directing the received selected host data transfer access command to the HDD controller circuit for inclusion in an HDD command queue pending subsequent execution; and if logical proximity is determined to exist, then directing the received selected host data transfer access command to the SSD controller circuit for inclusion in an SSD command queue pending subsequent execution.

12. The method of claim 11, wherein the access command is a read command, and the top level controller circuit directs the SSD controller circuit to transfer read data from the solid state memory to the local memory responsive to the read command identifying a logical address of a data set currently stored in the solid state memory.

13. The method of claim 11, wherein the access command is a write command, and the top level controller circuit directs the SSD controller circuit to write data to the solid state memory responsive to the write command identifying a logical address of a data set currently stored in the solid state memory.

14. The method of claim 11, wherein the access command is a write command, and the top level controller circuit directs the SSD controller circuit to write data to the solid state memory responsive to the write command identifying a logical address that falls within a selected one of the intervening gaps in the map structure between said successive pairs of the logical address sequences.

15. The method of claim 11, wherein the rotatable media comprises a magnetic recording disc.

16. The method of claim 11, wherein the solid state memory comprises a flash memory array.

17. The method of claim 11, wherein the hybrid data storage device further comprises a dynamic random access memory (DRAM) partitioned into a first portion used to temporarily store data transferred between the non-volatile rotatable storage media and the host, and a second portion used to temporarily store data transferred between the non-volatile solid state memory and the host.

18. The method of claim 11, wherein each of the top level controller circuit, the HDD controller circuit and the SSD controller circuit is characterized as a programmable processor that executes associated programming steps stored in a memory.

19. The method of claim 11, wherein the access command is a write command, and the top level controller circuit directs the SSD controller circuit to transfer a data block associated with the write command to the solid state memory responsive to the logical address of the data block falling within an intermediate portion of the gap between the first and second discrete logical address sequences in the map structure.

20. The method of claim 11, wherein at least one logical address falls between the last logical address of the first discrete logical address sequence and the logical address of the data block of the write command.

* * * * *